Jan. 2, 1968   G. A. VALENTINE   3,361,397
OCCUPANT ESCAPE APPARATUS FOR AIRCRAFTS AND THE LIKE
Filed July 23, 1965   5 Sheets-Sheet 1
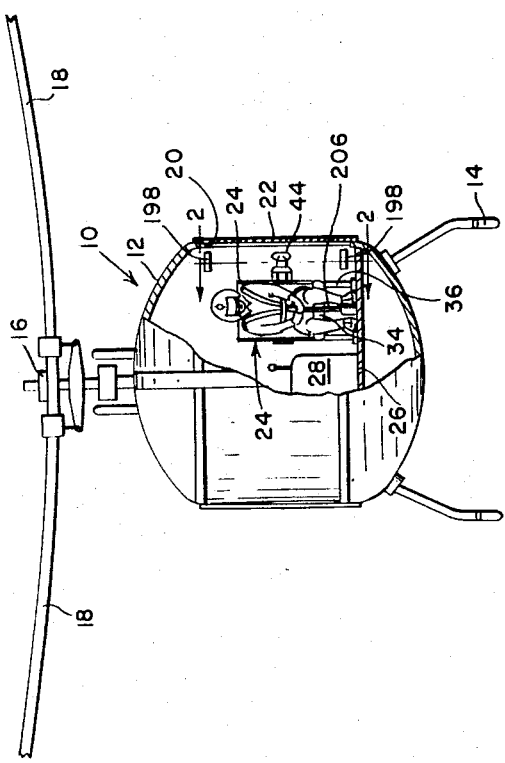
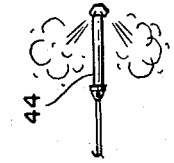
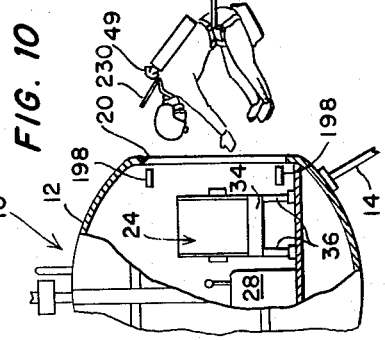
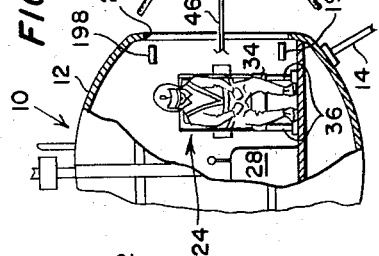
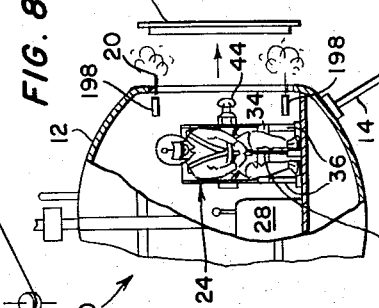
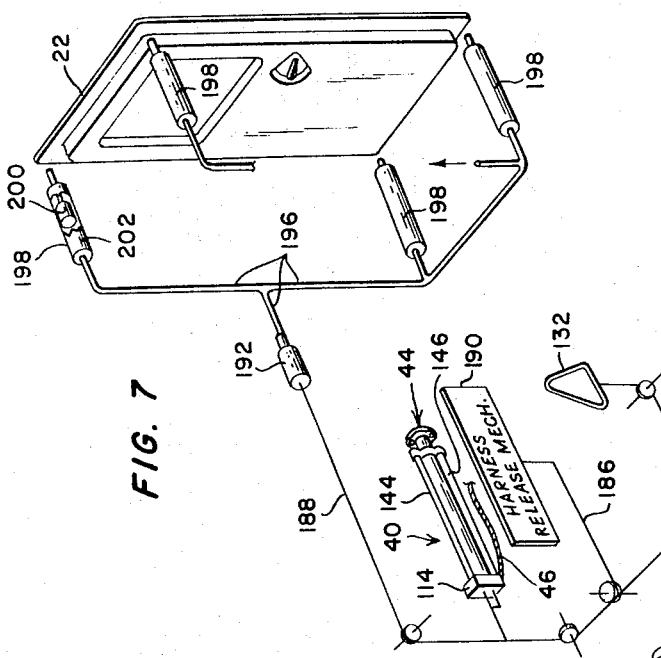
INVENTOR
GORDON A. VALENTINE
BY Strauch, Nolan, Neale,
Nies & Bronaugh
ATTORNEY

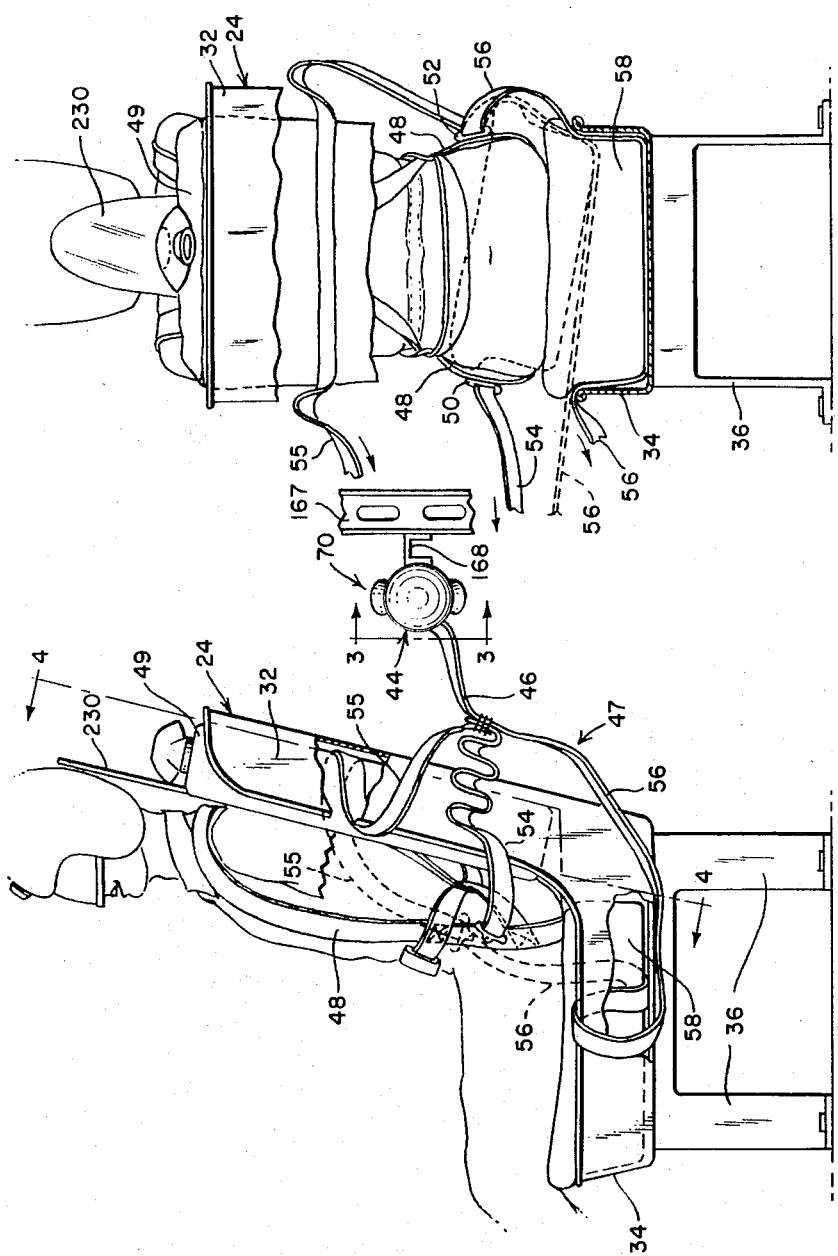

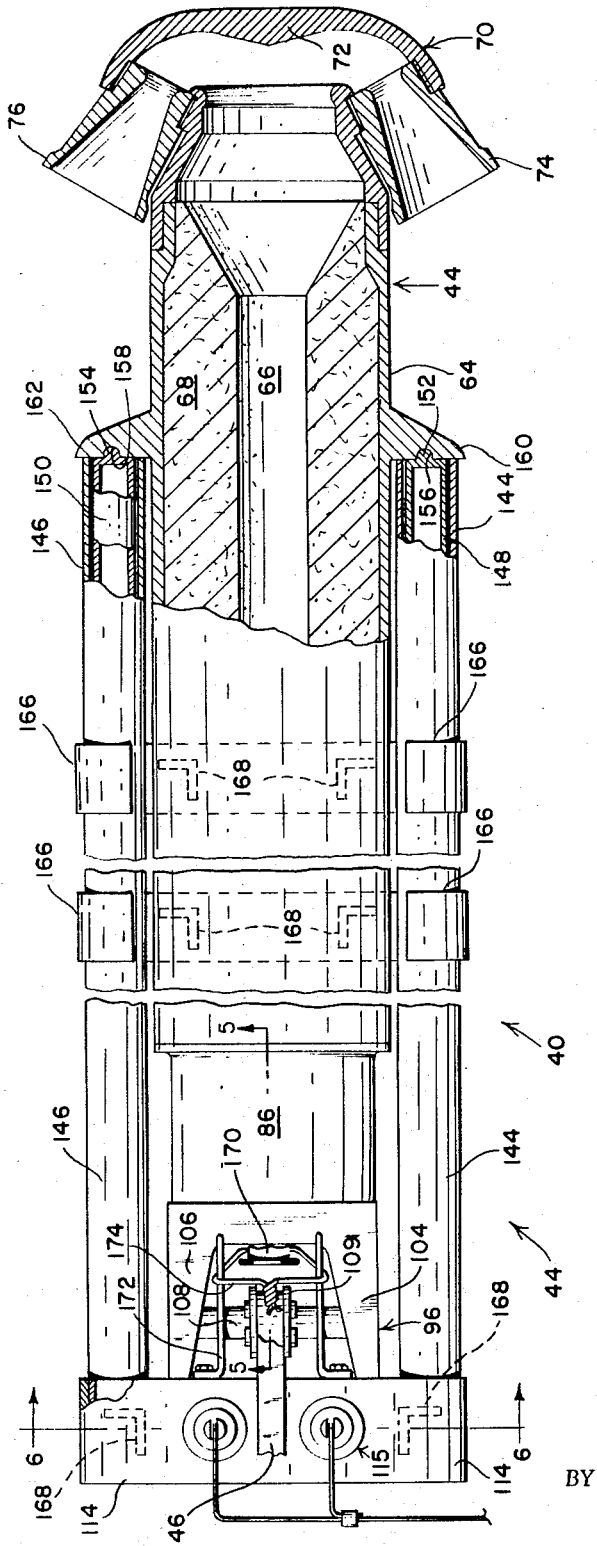

Jan. 2, 1968  G. A. VALENTINE  3,361,397
OCCUPANT ESCAPE APPARATUS FOR AIRCRAFTS AND THE LIKE
Filed July 23, 1965  5 Sheets-Sheet 4

INVENTOR
GORDON A. VALENTINE

BY Strauch, Nolan, Neale,
Nies & Bronaugh
ATTORNEY

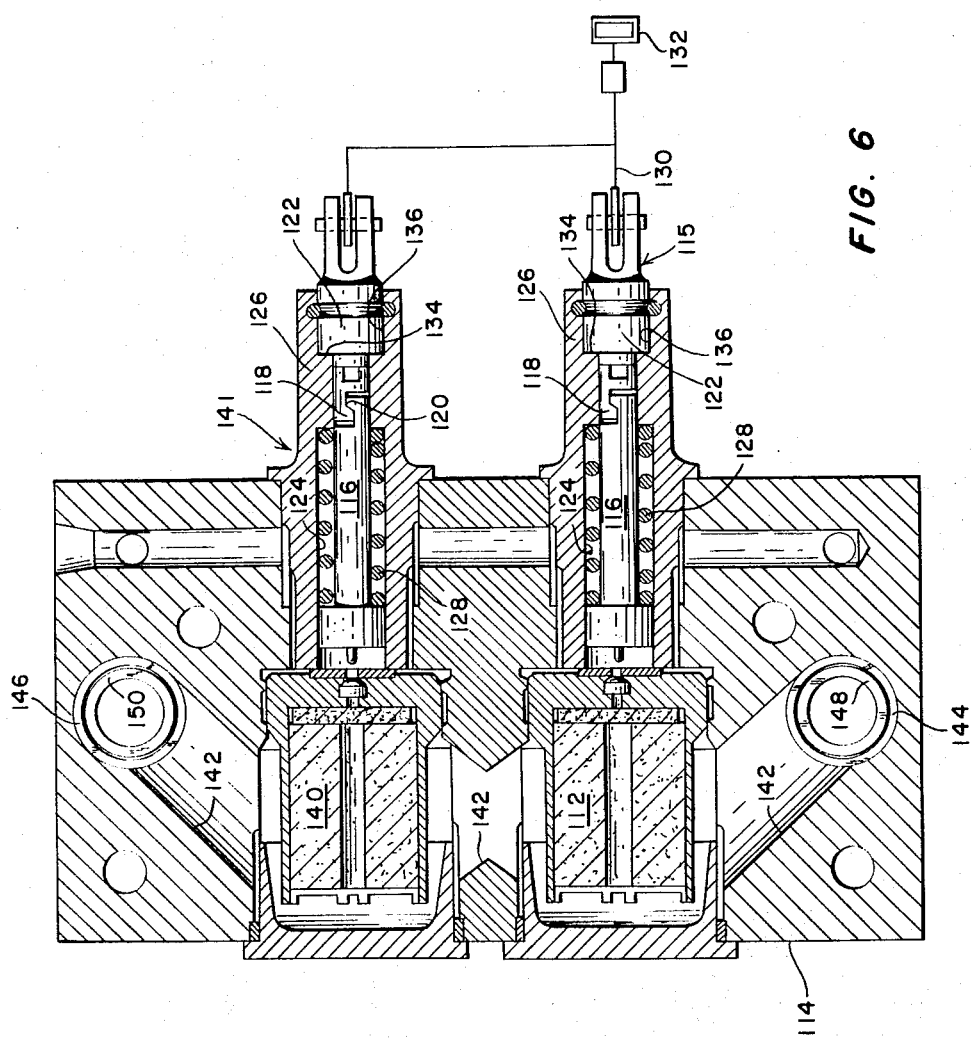

United States Patent Office 3,361,397
Patented Jan. 2, 1968

3,361,397
OCCUPANT ESCAPE APPARATUS FOR
AIRCRAFTS AND THE LIKE
Gordon A. Valentine, Denver, Colo., assignor to Stanley
Aviation Corporation, Denver, Colo.
Filed July 23, 1965, Ser. No. 474,297
13 Claims. (Cl. 244—122)

ABSTRACT OF THE DISCLOSURE

The escape apparatus disclosed herein for forcibly removing an occupant from an air or space vehicle comprises a rocket connected by a motion-transmitting towline to the occupant. The rocket is launched through a side opening in the vehicle and ignited for lateral flight away from the vehicle to extract the occupant, buttocks, first, through the side opening by means of the motion-transmitting connection provided by the tow line.

The present invention relates to escape apparatus for removing an occupant or other load from a vehicle such as an aircraft or spacecraft. More particularly, this invention is directed to a novel powered extraction escape system for safely and rapidly removing an occupant from a vehicle in an emergency.

The conventional routes of powered egress of a man from a disabled aircraft are either in an upward or a downward direction. In some aircraft, however, escape along these conventional routes is not possible or is exceptionally hazardous because of structure or equipment blocking the escape path. For instance, upward egress from a helicopter is precluded owing to the location of the rotor blades. Frequent close proximity of helicopters to the ground, on the other hand, often makes a downward escape very hazardous.

In overcoming these problems, the present invention contemplates an apparatus which enables the powered egress of an occupant essentially in a horizontal plane relative to the vehicle and, in its preferred embodiment, will be described as incorporated in a helicopter. It will be appreciated, however, that the present invention is equally advantageous where the customary upward or downward paths of escape are hazardous or are precluded by the presence of aircraft structure or equipment.

Accordingly, it is a major object of this invention to provide a novel escape apparatus whereby a powered egress of an occupant is effected in essentially a horizontal plane relative to the vehicle.

A more specific object of this invention is to provide a novel powered escape system for extracting an occupant from a vehicle laterally or essentially at right angles to the vehicle plane of symmetry.

In conjunction with the foregoing object, it is a further object of this invention (1) to apply a thrust to the occupant's parachute harness in such a manner as to rotate the occupant in his seated position about an axis passing approximately through his head and knees and then (2) to pull him through a suitable lateral egress opening buttocks first with his upper body, arms, and legs trailing behind. This feature of the present invention minimizes head acceleration and neck snap. In addition, contact between the occupant's upper body and head and the egress opening is less likely than if he were pulled out of the vehicle in a seated position or head first.

Still another more specific object of this invention is to provide a novel lateral escape system having a rocket connected by a bridle to the occupant's parachute harness and being laterally launchable from the vehicle to pull the occupant laterally through an egress opening in the vehicle and clear of vehicle structure and equipment.

Further objects of this invention will appear as the description proceeds in connection with the appended claims and annexed drawings wherein:

FIGURE 1 is a front elevation of a helicopter incorporating the present invention and having the cabin broken away to illustrate interior details;

FIGURE 2 is a section taken substantially along lines 2—2 of FIGURE 1;

FIGURE 3 is a section taken substantially along lines 3—3 of FIGURE 2;

FIGURE 4 is a section taken substantially along lines 4—4 of FIGURE 2;

Figure 5:
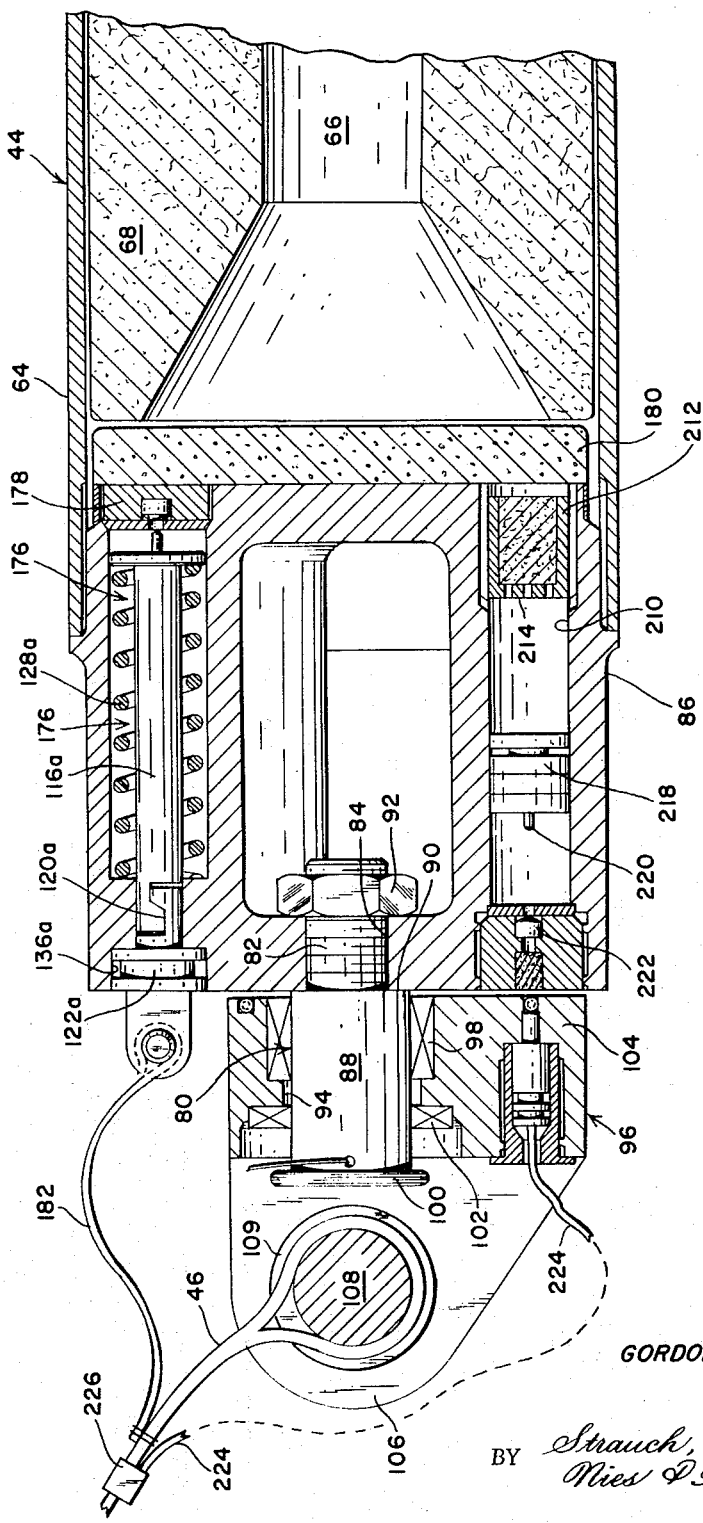

FIGURES 5 and 6 are sections respectively taken along lines 5—5 and 6—6 of FIGURE 3;

FIGURE 7 is a partially diagrammatic perspective view of the escape system incorporating the principles of this invention for laterally extracting the occupant illustrated in FIGURE 1; and FIGURES 8, 9, and 10 illustrate the preferred sequence of steps for making a lateral escape with the rocket extraction escape apparatus of this invention.

Referring now to the drawings and more particularly to FIGURES 1 and 2, a helicopter 10 incorporating the emergency escape apparatus of this invention is shown to conventionally comprise a cabin 12, landing skids 14, and a motor driven rotor assembly 16 which is provided with shaft mounted rotor blades 18 that rotate about a normally vertical axis substantially aligning with the symmetrical center line of the vehicle. Cabin 12 is provided with a generally rectangular side egress opening 20 which is closed by a door 22. Between the symmetrical center line of helicopter 10 and door 22, a seat 24 normally occupied by the pilot is disposed in cabin 12 and is rigidly fixed to the cabin frame which is generally indicated at 26. A console 28 containing control equipment and instruments is mounted in the forward part of cabin 12.

With continuing reference to FIGURES 1 and 2, seat 24 comprises an upstanding back 32 and a seat pan 34 mounted by legs 36 in a fixed position on the floor of cabin 12. Seat 24 essentially may be of suitable conventional form except that it is formed without high sides or other structure that would interfere with the powered lateral extraction of the occupant through egress opening 20 in a manner to be described in detail later on. As shown, seat 24 and its occupant are disposed immediately adjacent to door 22 in lateral alignment with egress opening 20.

In accordance with this invention, the apparatus for laterally extracting the occupant of seat 24 through egress opening 20 after door 22 is jettisoned is shown in FIGURES 2 and 3 to comprise a launcher and tractor-type rocket motor assembly 40 mounted in cabin 12 to the rear of seat 24. Alternatively, assembly 40 may be mounted on the cabin floor beneath seat pan 34.

Assembly 40, as shown in FIGURES 2–4, comprises a tractor-type rocket 44 having a swivel joint 45 which is connected by a tow line 46 and a bridle assembly 47 to a parachute harness 48 worn by the man occupying seat 24. Harness 48 may be of any suitable, conventional form and preferably is a standard Navy torso harness having a pair of bridle hip fittings 50 and 52. Fittings 50 and 52 are respectively located on the outboard side and the inboard side of the man in the region of his hips. A parachute recovery pack 49 is mounted on harness 48 and is normally disposed between the man and seat back 32 as shown. Pack 49 may be of any suitable, conventional form, but preferable is the type described in copending application Ser. No. 390,709, filed on Aug. 19, 1964, now abandoned, for Apparatus for Deploying and Opening Parachutes and assigned to the assignee of this application.

With continuing reference to FIGURES 2 and 4, the end of tow line 46 opposite from rocket 44 is secured to bridle assembly 47 which comprises three bridle lines 54, 55, and 56. Bridle line 54 is routed along the outboard side of seat 24 and is securely fastened by fitting 50 to parachute harness 48.

Bridle line 55 extends around the outboard side of seat 24 and is routed between the opposed surfaces of parachute pack 49 and back 32 to the inboard side of seat 24 where it is secured by fitting 52 to parachute harness 48. Bridle line 56 extends from its connection to tow line 46 around the outboard side of seat 24 and is routed between the top surface of seat pan 34 and the bottom surface of a survival kit 58 to extend to the inboard side of seat 24 where it is secured by fitting 52 to harness 48. Survival kit 58 is secured by harness 48 to the man. Tow line 46 and bridle lines 54–56 each may be formed of tough, flexible, multi-layer, nylon straps.

As shown in FIGURES 2–4, rocket 44 is mounted to be launched through egress opening 20 after door 22 is removed at right angles to the vehicle vertical plane of symmetry to pull tow line 46 and bridle lines 54–56 taut. The length and arrangement of bridle lines 54–56 are such that the thrust resulting from launching and igniting rocket 44 is applied to hip fittings 50 and 52 in such a manner that the seated man is first rotated in seat 24 about an axis passing substantially through his head and knees and then is pulled through egress opening 20 buttocks first with his upper body, arms, and legs trailing behind as shown in FIGURE 10. To rotate the man in seat 24 so that he is properly oriented for being extracted buttocks first through egress opening 20, it is clear that a lateral pull is first applied on inboard fitting 52 by tensioning bridle lines 55 and 56 which are respectively routed behind parachute pack 49 and under survival kit 58. Rocket 44 is so aimed that when it is launched to pull bridle lines 54–56 taut, lines 54–56 will pull forwardly and downwardly by an angle of about 15 degrees with a lateral axis passing through the man's shoulders.

Referring now to FIGURE 3, rocket 44 is of the type described in copending application Ser. No. 390,709 filed Aug. 19, 1964 for Occupant Escape Apparatus for an Aircraft or the Like and assigned to the assignee of the instant application. To provide a clear understanding of the present invention, rocket 44 will be generally described herein, reference being made to the aforesaid application Ser. No. 390,709 in the event further description is desired.

As shown in FIGURE 3, rocket 44 comprises a tubular casing 64 which defines a combustion chamber 66 for receiving a suitable gas generating propellant indicated at 68. Mounted on casing 64 at the forward or advancing end of rocket 44 is a nozzle assembly 70 comprising a hollow nose cap housing 72 which mounts a pair of rearwardly outwardly directed nozzles 74 and 76. Nozzles 74 and 76 are on diametrically opposed sides of housing 72 and respectively define venturi gas exhaust passages which communicate with chamber 66. The gases generated by burning the propellant stored in chamber 66 thus are exhausted through the passages defined by nozzles 74 and 76 to effectively pull rocket 44 through the air. Nozzles 74 and 76 are so directed as to impart to rocket 44 during its ignited flight a stabilizing spin in a predetermined direction about the rocket longitudinal axis.

As best shown in FIGURE 5, swivel joint 45 comprises a cylindrical swivel post 80 having a reduced diametered, threaded end section 82 which extends coaxially through a smooth cylindrical bore 84 formed in a cylindrical extension housing 86. Housing 86 is rigidly, coaxially fixed to the rearward end of casing 64. As shown, bore 84 axially aligns with the longitudinal axis of casing 64.

With continuing reference to FIGURE 5, post 80 is formed with an enlarged diametered, smooth intermediate section 88 extending rearwardly from housing 86 and providing a forwardly facing shoulder 90 which butts against a flat end face formed on housing 86. Swivel post 80 is axially retained in place by abutment of shoulder 90 against the end face of housing 86 and a nut 92 threaded onto the forward end of section 82 projecting beyond bore 84. Nut 92 is drawn tight to pull shoulder 90 snugly against the end face of housing 86.

Still referring to FIGURE 5, section 88 of swivel post 80 extends coaxially through a stepped bore 94 formed in a cross piece of a yoke 96. A bearing comprising a bushing 98 contained in bore 94 and carried by swivel post section 88 coaxially mounts yoke 96 for rotation on swivel post 80. Post 80 terminates at its rearward end projecting beyond bore 94 in an enlarged cylindrical head 100 which is held against a thrust bearing 102 carried by yoke 96. With this arrangement and construction of parts, it is clear that yoke 96 is rotatable on post 80, but is axially retained between opposed surfaces on head 100 and housing 86 respectively.

As best shown in FIGURE 3, yoke 96 is formed with a pair of rearwardly extending, parallel arms 104 and 106 which are bridged by a cross bar 108. Cross bar 108 is fixed to arms 104 and 106 and extends along an axis substantially normally intersecting the rotational axis of yoke 96 about post 80.

Tow line 46 is formed with a loop trained around a suitable pulley 109 mounted on cross bar 108. Swivel joint 45 permits rocket 44 to be spun about its axis in the manner previously described without spinning the man being extracted or entangling bridle lines 54–56. The overall length of the tow line 46 and bridle assembly 47 is about six feet to allow the extracted occupant to trail remotely behind rocket 44 when it is launched and ignited.

To launch rocket 44 from its mounted position in cabin 12, a conventional primer and cartridge assembly 112, as shown in FIGURE 6, is mounted in a rocket-mounting breechblock 114. A suitable firing mechanism 115 for igniting cartridge assembly 112 essentially comprises a firing pin 116. Firing pin 116 is formed at its rearward end with a notch 118 which interfittingly engages with a notch 120 formed in a cylindrical disconnect pin 122. Pins 116 and 122 are slidably coaxially received in a stepped bore 124 formed in a tubular adaptor piece 126 which is fixed to breechblock 114. A coiled spring 128 surrounding a reduced cylindrical shank section of firing pin 116 reacts against an internal shoulder in bore 124 to bias firing pin 116 toward an operative cartridge igniting position.

With continuing reference to FIGURE 6, disconnect pin 122 is connected by a schematically illustrated, mechanical motion transmitting cable 130 to an operating D-ring 132 which is manually pulled to ignite cartridge assembly 112. In the inoperative position of D-ring 132, firing pin 116 is held in a cocked, retracted position against the bias of spring 128 by engagement of disconnect pin 122 with an internal shoulder 134 formed in bore 124. When D-ring 132 is pulled by the occupant of seat 24, pins 116 and 122 through their interlocking notched ends are both pulled outwardly to compress spring 128. When the notched ends of pins 116 and 122 are withdrawn into an enlarged end bore section 136 of stepped bore 124, sufficient clearance is provided to allow pin 122 to laterally disengage from pin 116. As a result, firing pin 116 is free to be urged forwardly by spring 128 to ignite cartridge assembly 112. This firing mechanism is essentially of conventional construction.

Preferably, a second rocket-launching cartridge assembly 140 is mounted in breechblock 114 and is ignitable by a firing mechanism 141 which is preferably the same as that just described for igniting cartridge 112. Accordingly, like reference numerals have been used to identify like parts. Firing mechanism 141 also is connected to D-ring 132 by motion transmitting assembly 130 to ignite cartridge assembly 140 simultaneously with the ignition of cartridge 112.

The expanding gases generated by ignition of either or both cartridge assemblies 112 and 140 pass through bored passages indicated at 142 in breechblock 114 and into a pair of rigid launching tubes 144 and 146 as shown in FIGURE 3. Tubes 144 and 146 are securely threaded at their rearward ends in breechblock 114 and extend forwardly in parallel relation with the longitudinal axis of rocket 44 on diametrically opposite sides of casing 64. Slidably received in launching tubes 144 and 146 are rocket launching push rods 148 and 150. Push rods 148 and 150 project beyond launching tubes 144 and 146 and terminate at their forward ends in fittings 152 and 154 which are interfittingly seated in sockets 156 and 158 respectively. Sockets 156 and 158 are formed in radially extending arm portions 160 and 162 which are rigid with casing 64. The expanding gases generated by igniting cartridge assemblies 112 and 140 flow into launching tubes 144 and 146 to eject push rods 148 and 150 and thereby launch rocket 44 from its mounted position in cabin 12.

Launching tubes 144 and 146 are rigidly fixed together by suitable longitudinally spaced apart brackets 166 through which rocket 44 slidably extends. Brackets 166 and breechblock 114 are rigidly fixed to a cabin bulkhead 167 by suitable structural members indicated at 168. Rocket 44 is supported adjacent its forward end in the stored position illustrated in FIGURE 1 by seating engagement of fittings 152 and 154 in sockets 156 and 158 respectively. Any suitable, conventional means may be employed for releasably securing and supporting rocket 44 on breechblock 114 such as, for example, a part 170 secured to rocket 40 and releasably secured to a bracket 172 by lock wire 174. Bracket 172 is rigidly fixed to breechblock 114 as shown. Rocket 44 is mounted about midway between the top and bottom of seat back 32.

As shown in FIGURE 5, a firing mechanism 176 mounted in housing 86 is actuable to strike a primer 178 for igniting a charge 180 comprising black powder contained in the rearward end of casing 64. The main body of rocket propellant 68 is ignited by ignition of charge 180.

Firing mechanism 176 advantageously is of the same construction as firing mechanism 115. Accordingly like reference numerals suffixed by the letter a have been used to identify the parts of firing mechanism 176. Preferably, a second firing mechanism (not shown) having the same construction as firing mechanism 176 is mounted in housing 86 and is actuable simultaneously with firing mechanism 176 to assure ignition of charge 180.

Firing pin 116a is releasably retained in its illustrated cocked position by locking engagement of notches 118a and 120a and by seating engagement of disconnect pin 122a on shoulder 134a in the manner previously described for firing mechanism 115.

In accordance with this invention, rocket 44 is launched in unignited condition from cabin 12. Disconnect pin 122a of firing mechanism 176 is connected by a cord 182 to tow line 46 at such a point to pull disconnect pin 122a rearwardly from housing 86 when tow line 46 is pulled taut as a result of launching rocket 44. When the notched end of disconnect pin 122a is pulled rearwardly into bore section 136a the notched ends of pins 116a and 122a slip apart allowing the bias of spring 128a to thrust firing pin 116a forwardly to strike primer 178. Primer 178 ignites charge 180 which, in turn, ignites the main body of rocket propellant 68 as previously described. Thus, it will be appreciated that rocket 44 does not ignite until tow line 46 is pulled taut.

To initiate an automatic escape sequence with the apparatus of this invention, D-ring 132 in addition to being connected to actuate firing mechanisms 115 and 141 for igniting the rocket launching cartridge assemblies 112 and 140 is connected by suitable motion transmitting cables 186 and 188 (see FIGURE 7) to a mechanical crash harness release mechanism 190 and to a mechanically fired initiator 192. Release mechanism 190 may be of any suitable, conventional form for releasing the occupant's crash restraint harness strapping the occupant to seat 24. Initiator 192 also may be of any suitable, conventional form having an unshown cartridge which is fired by pulling D-ring 132. The gases generated by activating initiator 192 are delivered through suitable conduits indicated at 196 to four door jettison thrusters 198. Thrusters 198 may be of any suitable, conventional form, each essentially comprising a thruster piston 200 operatively connected to door 22 and slidably received in a cylinder 202. Piston 200 is outwardly displaceable by pressure of gas delivered by initiator 192 to force door 22 away from the aircraft. Thrusters 198 are preferably located one at each corner of door 22 for applying a substantially uniform jettisoning thrust thereto.

Referring now to FIGURES 8-10, the escape system of this invention is initiated by pulling D-ring 132 which actuates harness release mechanism 190 and fires initiator 192 to jettison door 22 and to simultaneously release the man from seat 24. Firing mechanisms 115 and 141 are actuated simultaneously by pulling D-ring 132, but cartridge assemblies 112 and 140 preferably are of the delayed type which ignite after a short delay of about one-half of a second following the actuation of release mechanism 190 and initiator 198. Pulling D-ring 132 may also stow or cut away by suitable linear-shaped charges (not shown) obstructions such as the collective pitch control stick indicated at 206 in FIGURE 1.

Ignition of cartridge assemblies 112 and 140 launches rocket 44 in unignited condition for lateral flight through egress opening 20 to pull tow line 46 taut as shown in FIGURE 9. Pulling of tow line 46 taut actuates firing mechanism 176 to ignite the main body of rocket propellant 68 in the manner previously described. Ignition of rocket 44 applies a thrust force first to the man's inboard hip fitting 52 through bridle lines 55 and 56 to rotate the man in his seated position for extraction buttocks first as previously described. Continued ignited flight of rocket 44 then extracts the man buttocks first through egress opening 20 with his upper body, arms, and legs trailing behind. Rocket 44 is provided with sufficient propellant to extract the man until he is clear of rotor blades 18 or any other obstructions in other forms of vehicles.

The gases generated by igniting cartridge assemblies 112 and 140 eject push rods 148 and 150 out of launching tubes 144 and 146 respectively. When push rods 148 and 150 clear launching tubes 144 and 146, they separate from rocket 44 as shown in FIGURE 9.

To release the man from rocket 44 after he is extracted clear of the vehicle and any obstructions such as rotor blades 18, any suitable means may be employed for cutting tow line 46. For example, as shown in FIGURE 5, a bore 210 is formed in housing 86 along an axis extending parallel to but laterally offset from the longitudinal axis of rocket 44. Mounted in the forward end of bore 210 is a forwardly opening metal well 212 having an apertured bottom 214 and containing a suitable charge 216 of rocket propellant.

Propellant 216 is ignited by charge 180 along with the ignition of the main body of rocket propellant 68. Charge 216 is sized to burn out just prior to burn out of propellant 68 to expose the apertured bottom 214 to chamber 66 in rocket 44. As a result, the gases generated by burning the remaining portion of rocket propellant 68 pass through the apertured bottom of well 212 to rearwardly urge a piston 218 which is slidably mounted in bore 210. Piston 218 carries a firing pin 220 which strikes a primer 222 when piston 218 is thrust to the rearward end of bore 210 by the gases passing through the apertured bottom of well 212. Primer 222 ignites a fuse 224 which detonates almost instantly to ignite a linear-shaped charge 226. Charge 226 is secured to tow line 46 with the result that detonation of charge 246 cuts tow line 46 to thereby release the man from rocket 44. At this stage of the escape sequence, rocket 44 has sufficient propellant left to fly a sufficient distance away from the extracted occupant to permit safe projection and deployment of his recovery parachute. Preferably, parachute pack 49 is provided with a head rest 230 which gives head support and protection for the man being extracted through egress opening 20.

From the foregoing description, it will be appreciated that lateral extraction of the seated man is quickly and safely effected to remove him to a location where a safe parachuted recovery can be made. The explosive force generated by cartridge assemblies 115 and 141 need only be sufficient to launch rocket 44 from its stored position shown in FIGURE 8 to a position where tow line 46 is pulled taut since, according to this invention, the thrust generated by igniting rocket 44 is used to extract the man and pull him safely clear of the vehicle. As a result, the recoil resulting from igniting cartridge assemblies 112 and 140 is minimized and is of such low magnitude as not to cause injury to the man being extracted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An escape apparatus for forcibly removing a seated occupant from an air or space vehicle comprising a rocket mounted in said vehicle, means including a motion-transmitting towline connecting said rocket to the seated occupant in the vehicle, and means for launching said rocket through a side opening in the vehicle and for igniting the rocket to effect flight of the rocket laterally away from said vehicle, the flight of said rocket laterally away from said vehicle being effective to pull said towline taut to effect a lateral extraction of said occupant through said side opening by the thrust exerted by the ignited rocket.

2. An escape apparatus for removing a seated occupant from an air or space vehicle, said escape apparatus comprising a tractor rocket mounted in said vehicle, means for launching and igniting said rocket for flight from said vehicle along a path contained in a plane extending transversely of the vertical plane of symmetry of said vehicle, and means including a tow line assembly securing said occupant to said rocket for unseating and pulling the occupant out of said vehicle along the rocket flight path by flight of said rocket away from said vehicle.

3. The escape apparatus defined in claim 2 comprising means for rotating the seated occupant to a position where he is pulled buttocks first from said vehicle.

4. The escape apparatus defined in claim 3 wherein said means for rotating said occupant comprises a pair of fittings worn by the occupant on opposite hip regions, a plurality of bridle lines forming a part of said tow line assembly and connected at least one to each of said fittings, said bridle lines being of such lengths and so arranged as to apply the thrust of the flying rocket to one hip before the other to thereby swing said seated occupant about an axis passing approximately through his head and knees.

5. The escape apparatus defined in claim 2 wherein said tow line assembly is secured to the occupant only in the region of his hips to so transmit the rocket extracting thrust in pulling him buttocks first that his body, arms, and legs trail behind.

6. The escape apparatus defined in claim 2 wherein said rocket is aimed to extract said occupant laterally from said vehicle.

7. The escape apparatus defined in claim 2 wherein said means for launching and igniting said rocket comprises means for selectively launching said rocket in unignited condition from said vehicle and means responsive to a predetermined condition for igniting said rocket only after it is launched from said vehicle.

8. The escape apparatus defined in claim 6 wherein said means for launching and igniting said rocket comprises means for launching said rocket in unignited condition from said vehicle and means responsive to the tension applied to said tow line assembly by launching said rocket for igniting said rocket after it leaves said vehicle.

9. In combination with an air or space vehicle, an escape apparatus for removing an occupant from a seat in said vehicle and comprising means providing a lateral egress opening in said vehicle, a rocket mounted in said vehicle, means for launching said rocket through said egress opening and for igniting said rocket for flight away from said vehicle along a path contained in a plane extending transversely of the vertical plane of symmetry of said vehicle, and means including a tow line assembly securing said occupant to said rocket for unseating and pulling the occupant through said egress opening, said tow line assembly being of sufficient length that said occupant trails remotely behind said rocket in its flight away from said vehicle.

10. The combination defined in claim 9 comprising means for rotating the seated occupant to a position where he is pulled buttocks first from said vehicle.

11. The combination defined in claim 9 wherein said opening is disposed adjacent to the outboard side of the seated occupant and wherein said tow line assembly comprises a plurality of bridle lines, a pair of fittings worn by said occupant on opposite sides in the region of his hips, at least one bridle line being connected to each of said fittings, said bridle lines having such lengths and being so arranged that the rocket extracting thrust is applied first to the seated occupant's inboard hip fitting before being applied to the outboard hip fitting to rotate said occupant to a position where his buttocks face said egress opening.

12. The escape apparatus defined in claim 1 wherein said means connecting said rocket to said occupant is effective when the ignited rocket exerts a pull on said towline to turn the occupant to a position where he is pulled buttocks first through said side opening.

13. The escape apparatus defined in claim 12 comprising means for disconnecting the extracted occupant from said rocket prior to burn-out of the rocket propellant to enable the rocket to fly laterally away from the extracted occupant.

References Cited

UNITED STATES PATENTS 2,826,120  3/1958  Lang et al. _____ 89—1.803
3,222,015  12/1965  Larsen et al. _____ 244—141

FOREIGN PATENTS 1,216,206  11/1959  France.

MILTON BUCHLER, *Primary Examiner.*

ALFRED E. CORRIGAN, *Examiner.*

B. BELKIN, *Assistant Examiner.*